United States Patent

Motomura et al.

[11] Patent Number: 5,556,718
[45] Date of Patent: Sep. 17, 1996

[54] MAGNETORESISTIVE HEAD

[75] Inventors: Yoshihiro Motomura; Suzuki Tetsuhiro, both of Tokyo, Japan

[73] Assignee: NEC Corporation, Tokyo, Japan

[21] Appl. No.: 62,221

[22] Filed: May 18, 1993

[30] Foreign Application Priority Data

May 18, 1992 [JP] Japan ................................. 124024
Feb. 16, 1993 [JP] Japan ................................. 026362

[51] Int. Cl.$^6$ ................................................. G11B 5/66
[52] U.S. Cl. ................................. 428/694 R; 428/694 T; 428/694 TS; 428/694 TM; 428/692; 428/678; 428/900; 360/113
[58] Field of Search ................. 428/694 T, 694 TS, 428/694 TM, 692, 900, 678, 694 R; 360/113

[56] References Cited

U.S. PATENT DOCUMENTS 3,864,751  2/1975  Bequlieu et al. .................. 360/113
4,835,069  5/1989  Sawada et al. .................... 428/694 T

FOREIGN PATENT DOCUMENTS 0503499  3/1992  European Pat. Off. .

Primary Examiner—Leszek Kiliman
Attorney, Agent, or Firm—Sughrue, Mion, Zinn, Macpeak & Seas

[57] ABSTRACT

In a magnetoresistive effect head comprising a ferromagnetic magnetoresistive effect layer, an inverse ferromagnetic layer (3) for generating a longitudinal bias magnetic field by an exchange force with respect to the ferromagnetic magnetoresistive effect layer (4), a ground layer (2) having a face-centered cubic structure is provided on only a portion of the anti-ferromagnetic layer. In the magnetoresistive effect head further comprising a soft magnetic bias-assistant layer (12) for a transversal bias magnetic field in the ferromagnetic magnetoresistive effect layer (15), the soft magnetic bias-assistant layer (12) has a crystal structure other than a face-centered cubic structure, the ground layer (13) having a face-centered cubic structure is provided on only a portion of the anti-ferromagnetic layer (14).

17 Claims, 2 Drawing Sheets

MAGNETORESISTIVE HEAD

BACKGROUND OF THE INVENTION

The present invention relates to a magnetoresistive head (hereinafter referred to as an MR head), which comprises a ferromagnetic magnetoresistive effect element (hereinafter referred to as an MR element) making use of a ferromagnetic magnetoresistive effect for reproducing magnetic information written in a magnetic recording medium.

As is well known in the art, the MR element is capable of producing a high level output independent of the relative velocity of the element and recording medium, and its application to a reproducing head of small size and high density magnetic recording apparatus has been in focus. For the practical use of the MR element to the head for reproducing magnetically recorded signals, it is necessary to meet two basic requirements.

A first requirement is that the MR element is capable of linear response to the magnetic information written in the magnetic recording medium. To this end, in the MR head a bias magnetic field is applied in a direction orthogonal to a sense current flowing in the MR element (hereinafter referred to as transversal bias magnetic field) so as to set the angle θ between the sense current and the magnetization M of the MR element (hereinafter referred to as bias angle) to a predetermined value (desirably 45 degrees). For providing the bias magnetic field, various methods have been proposed. U.S. Pat. No. 3,864,751 discloses a structure, in which a soft magnetic bias-assistant layer or a soft adjacent layer and an MR element are laminated with an intervening electric insulating layer. This United States Patent also discloses a method, in which a soft bias-assistant layer is magnetized by supplying a sense current to the MR element, while using a magnetic field generated by the soft magnetic bias-assistant layer to apply the transversal bias magnetic field to the MR element. As another bias means, Japanese Utility Model Laid-Open No. 159,518/1985 discloses a structure, in which a non-crystalline soft magnetic bias-assistant layer and an MR element are laminated with an intervening non-magnetic conductive layer. In this structure, the resistivity of the non-crystalline soft magnetic bias-assistant layer is extremely high compared to the resistivity of the MR element. Thus, a major portion of the sense current flows through the MR element, so that it is possible to obtain substantially the same bias effect as obtainable with a structure, in which the non-crystalline soft magnetic bias-assistant layer and MR element are electrically insulated from each other. According to this bias method there is no need of maintaining the electric insulation between the non-crystalline soft magnetic bias-assistant layer and MR element, thus permitting the formation of a compact MR head with a reduced thickness of the non-magnetic conductive layer.

The second requirement is to suppress Barkhausen noise, which is a main cause of reproduced signal noise and deteriorates the quality of the reproduced signal. The Barkhausen noise is thought to stem from the movement of magnetic walls generated by an inverse magnetic field at an end of the MR element. Accordingly, there have been proposed a number of methods of eliminating the magnetic walls by making the MR element part to be of a single domain. Japanese Patent Laid-Open No. 40,610/1987 discloses a structure, in which an anti-ferromagnetic material is provided at each MR element end to make use of mutual exchange action of the two portions of the anti-ferromagnetic material for applying a bias magnetic field in the sense current direction (hereinafter referred to as longitudinal bias magnetic field).

For generating the bias magnetic field with the anti-ferromagnetic material, there are several restrictions. A first restriction is that it is necessary to form the anti-ferromagnetic layer in direct contact with the ferromagnetic magnetoresistive effect layer since the bias magnetic field is generated with the exchange force. A second restriction is that the anti-ferromagnetic material has to be patterned such as to be present only at opposite end portions of the MR element. This is so because if the exchange force is active over the entire MR element, the response character thereof is deteriorated due to a high anisotropic magnetic field in the inverse magnetic layer. To meet the above two restrictions, as shown in FIG. 3, the ferromagnetic magnetoresistive effect layer 4 and anti-ferromagnetic layer 3 are formed continuously in vacuum, and then only the anti-ferromagnetic layer 3 is etched. In this patterning, however, it is difficult to selectively etch only the anti-ferromagnetic layer 3. In addition, an over-etching will result in deterioration of the characteristic of the ferromagnetic layer. In FIG. 3, 1 is a non-magnetic substrate, 5 is a non-magnetic conductive layer, 7 are electrodes, and 6 is bias-assistant layer.

SUMMARY OF THE INVENTION

An object of the invention is therefore to provide a magnetoresistive head, which is subject to less Barkhausen noise and is simple in structure.

According to one aspect of the present invention, there is provided a magnetoresistive head comprising a ferromagnetic magnetoresistive effect layer, an anti-ferromagnetic layer for generating a longitudinal bias magnetic field with an exchange force with respect to the ferromagnetic magnetoresistive effect layer, the anti-ferromagnetic layer being provided in direct contact with the ferromagnetic magnetoresistive effect layer and composed of or mainly composed of FeMn, and means for generating a transversal bias magnetic field in the ferromagnetic magnetoresistive effect layer, wherein a ground layer having a face-centered cubic structure is provided on only a portion of said anti-ferromagnetic layer.

According to another aspect of the present invention, there is provided a magnetoresistive head comprising a ferromagnetic magnetoresistive effect layer, an anti-ferromagnetic layer for generating a longitudinal bias magnetic field by an exchange force with respect to the ferromagnetic magnetoresistive effect layer, and a soft magnetic bias-assistant layer for generating a transversal bias magnetic field in the ferromagnetic magnetoresistive effect layer, wherein the soft magnetic bias-assistant layer has a crystal structure other than a face-centered cubic structure, a ground layer having a face-centered cubic structure is provided on only a portion of the anti-ferromagnetic layer, and the soft bias-assistant layer, the ground layer, the anti-ferromagnetic layer and the ferromagnetic magnetoresistive effect layer are laminated in the mentioned order.

Other objects and features will be clarified from the following description with reference to the attached drawings.

DETAILED DESCRIPTION OF THE PREFERRED EMBODIMENTS

Figure 1:
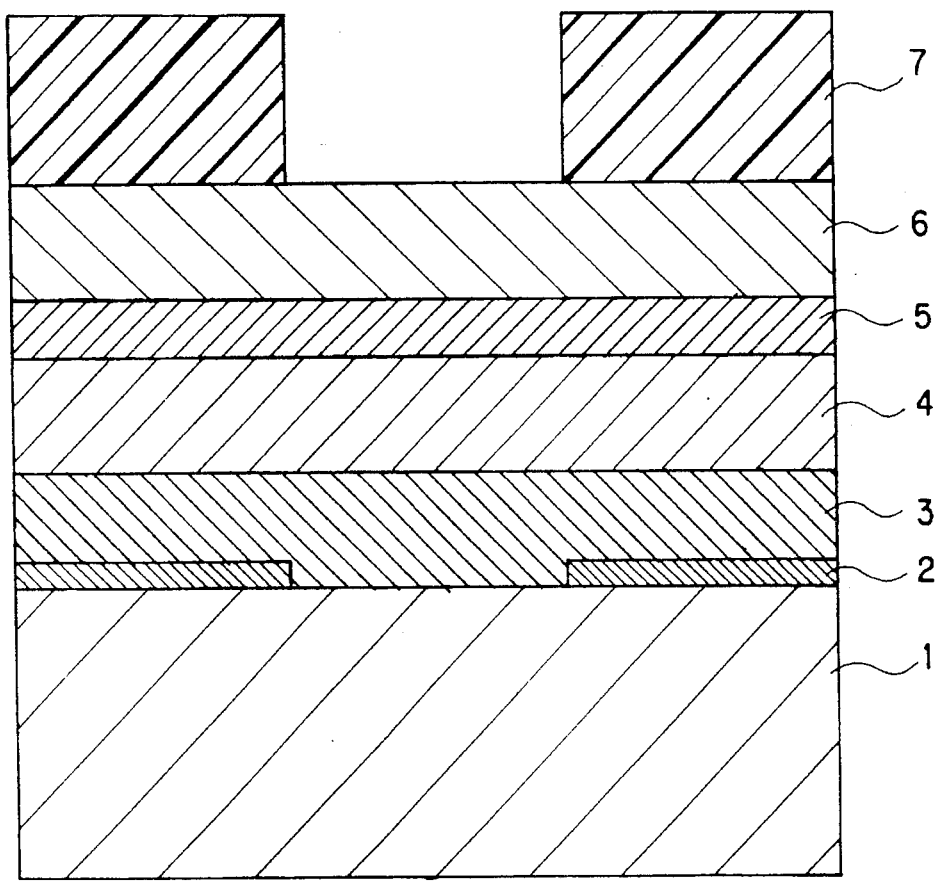
FIG. 1 shows a sectional view of a magnetoresistive head according to one aspect of the present invention.

Embodiments of the present invention will now be described with reference to the drawings. FIG. 1 is a sectional view showing an example of the MR head according to the present invention. On a substrate 1 is formed a ground layer 2 having a face-centered cubic structure, and it is patterned to a predetermined shape. On this layer, an anti-ferromagnetic layer 3, a ferromagnetic magnetoresistive effect layer 4, a non-magnetic intermediate layer 5 and a bias-assistant layer 6 are laminated in the mentioned order. These laminated layers are patterned to predetermined shapes, and then electrodes 7 are formed to the laminate to complete the MR head.

As the material of the substrate 1, which is a non-magnetic substrate, according to the invention may be used glass, $Al_2O_3$, TiC, SiC, sintering composed of $Al_2O_3$ and TiC, ferrite, etc. As the ground layer 2 may be used Cu or alloys of NiCr or the like having face-centered cubic structures with or without additives. As the inverse ferromagnetic layer 3 may be used anti-ferromagnetic alloys of FeMn, FeMnCr, etc. with or without additives. As the ferromagnetic magnetoresistive effect layer 4 may be used Co, Ni or ferromagnetic alloys, e.g., Ni—Fe, Co—Fe, Co—Ni, etc., with or without additives. As the non-magnetic intermediate layer 5 may be used non-magnetic conductive alloys, e.g., Ti, Mo., Cr, Ta, etc. As the bias-assistant layer 6 may be used non-crystalline soft magnetic materials, e.g., CoZr, CoZrNb, CoZrMo, CoZrTa, CoTa, etc.

The anti-ferromagnetic material for generating the longitudinal bias magnetic field and mainly composed of FeMn, has magnetic characteristics dependent on its crystal structure, and the γ phase having a face-centered cubic structure has stable anti-ferromagnetic phase at room temperature or above as stated before. This γ phase is comparatively unstable and can steadily grow only on a ground layer having the same face-centered cubic structure. With the MR head according to the invention the same effect as that of patterning the anti-ferromagnetic layer is obtainable by providing a ground layer having a face-centered cubic structure on only a portion, in which it is desired to generate a bias magnetic field by an exchange coupling force.

In one experimental example, referring to FIG. 1, a NiCr layer having a thickness of 100 Angstroms was formed as a ground layer 2 on a glass substrate 1 by a sputtering deposition process. On this layer was formed a predetermined photoresist pattern, and it was ion-etched in an Ar gas atmosphere to obtain two rectangular patterns spaced apart in the longitudinal direction by 10 microns and each having a length of 20 microns and a width of 5 microns. On this photoresist pattern were laminated by the spattering process a FeMn layer 3 having a thickness of 200 Angstroms, a Permalloy layer 4 (82% Ni-18% Fe, % being by weight) having a thickness of 400 angstroms, a Ti layer 5 having a thickness of 200 Angstroms and a CoZrMo layer 6 having a thickness of 400 Angstroms. On this laminate was formed a predetermined photoresist pattern, which was then ion-etched in an Ar gas atmosphere to a rectangular pattern with a length of 50 microns and a width of 5 microns. At this time, the rectangular pattern was made to overlap the ground layer pattern noted above.

Then, electrodes 6 for supplying a sense current were formed on the above laminate by using Au, thus completing an element. This element is referred to as Example 1. The electrodes are located at positions of 3 microns from the rectangular pattern center to the opposite sides, and the distance between the electrodes was set to 6 microns.

As Example 2, an MR head was produced in the same process as in Example 1 except for omitting the step of patterning the ground layer. As Example 3, an MR head was produced in the same process as in Example 1 except that the ground layer was not provided. Table 1 shows measurement results of electric resistance versus magnetic field (R-H) curves obtained by applying external field set by causing a sense current of 10 Ma in the above MR heads. As is obvious from the results shown in Table 1, the MR head according to the invention is highly sensitive, free from recognizable Barkhausen noise and has excellent performance.

As described above, the magnetoresistive head according to the invention comprises a ferromagnetic effect layer, an anti-ferromagnetic layer for generating a longitudinal bias magnetic field with an exchange force with respect to the ferromagnetic magnetoresistive effect layer, the anti-ferromagnetic layer being provided in direct contact with the ferromagnetic magnetoresistive effect layer and composed of or mainly composed of FeMn, and means for generating a transversal bias magnetic field in the ferromagnetic magnetoresistive effect layer, wherein a ground layer having a face-centered cubic structure is provided on only a portion of the anti-ferromagnetic layer. It is thus possible to obtain a magnetoresistive head, which is free from Barkhausen noise.

Another embodiment of the present invention comprises a soft magnetic bias layer, which has a structure other than a face-centered cubic structure. Thus, a portion of the anti-ferromagnetic layer mainly composed of FeMn that is formed in contact with the soft magnetic bias layer is not magnetic and acts as a layer for magnetically isolating the soft magnetic bias layer and the ferromagnetic magnetoresistive effect layer from each other. This means that there is no need of providing a separate non-magnetic conductive layer for magnetically isolating the ferromagnetic magnetoresistive layer and the soft magnetic bias layer from each other, thus permitting simplification of the process of manufacture. In addition, it is possible to reduce the number of targets by using the same material, e.g., NiFe, for both the ferromagnetic magnetoresistive effect layer and ground layer.

Figure 2:
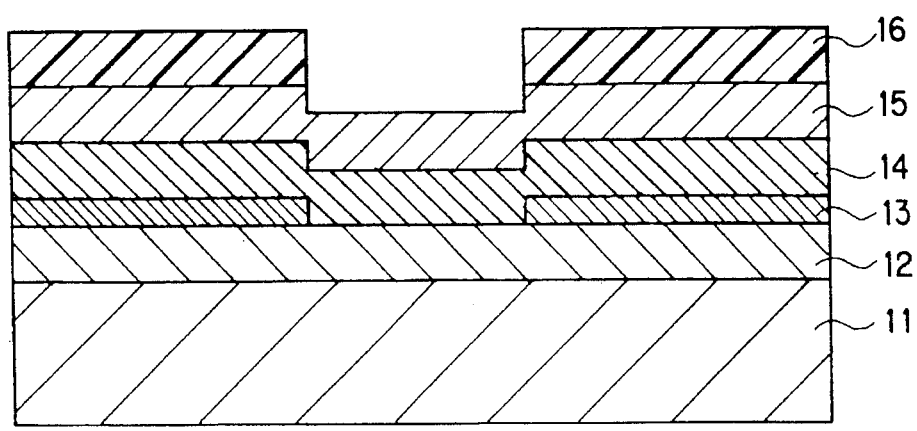
FIG. 2 shows a sectional view of a magnetoresistive head according to another aspect of the present invention.
Figure 3:
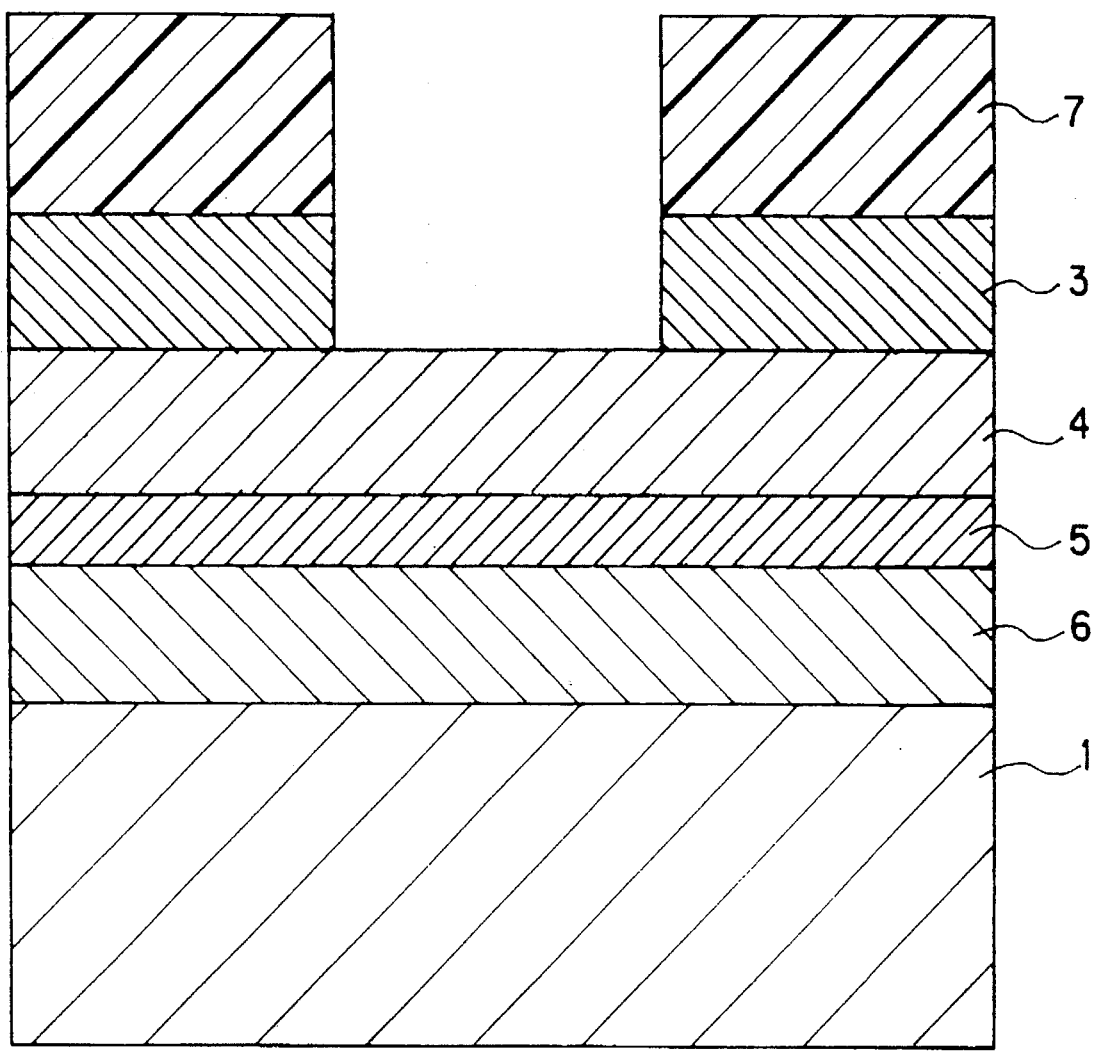
FIG. 3 shows a sectional view of the conventional magnetoresistive head.

The invention will further be described in detail with reference to the drawings. FIG. 2 shows an example of the MR head according to the invention. This MR head is produced as follows. First, a soft magnetic bias-assistant layer 12 is formed on a non-magnetic substrate 11. On this layer is formed a ground layer 13 having a face-centered cubic structure, and it is patterned to a predetermined shape. Then, on the patterned ground layer an anti-ferromagnetic layer 14 and a ferromagnetic magnetoresistive effect layer 15 are laminated in the mentioned order. The laminated layers are then patterned to a predetermined shape, and then electrodes 16 are provided, thus completing the MR head.

The material used for the non-magnetic substrate 11 may be glass, Si Al, $Al_2O_3$, TiC, SiC, sintering composed of $Al_2O_3$ and TiC, ferrite, etc. The material used for the soft magnetic bias-assistant layer 12 may be non-crystalline soft magnetic materials, e.g., CoZr, CoZrNb, CoZrMo, COZrTa, CoTa, etc. The material used for the ground layer 13 may be Cu or an alloy having a face-centered cubic structure, e.g., NiCr, NiFe, etc., with or without additives. The material used for the anti-ferromagnetic layer 14 may be anti-ferromagnetic alloys, e.g., FeMn, FeMcCr, etc., with or without additives. The material used for the ferromagnetic magnetoresistive effect layer 15 may be Co, Ni or a ferromagnetic alloy, e.g., Ni—Fe, Co—Fe, Co—Ni, etc.

The MR head according to the this embodiment was fabricated by the following procedures. On a glass substrate 11 were laminated a CoZrMo layer with a thickness of 400 Angstroms as soft magnetic bias layer 12 and a NiFe layer with a thickness of 100 Angstroms as ground layer 13. On this laminate was formed a predetermined photoresist pattern, and the NiFe layer was then ion-etched in an Ar gas atmosphere into two rectangular patterns spaced apart by 10 microns in the length direction and each having a length of 20 microns and a width of 5 microns. Then, by the sputtering deposition process a FeMn layer with a thickness of 200 Angstroms as anti-ferromagnetic layer 14 and then a Permalloy layer (82% Ni-18% Fe, % being by weight) with a thickness of 400 Angstroms as ferromagnetic magnetoresistive effect layer 15 are laminated. Then, on this laminate was formed a predetermined photoresist, which was then ion etched in an Ar gas atmosphere to a rectangular pattern with a length of 50 microns and a width of 5 microns. At this time, the rectangular pattern was made to overlap the pattern of the ground layer 13. Then electrodes 16 for supplying sense current were provided on the laminate. The electrodes 16 were at a distance of 13 microns from the center of the rectangular pattern to the opposite sides, and the distance between the electrodes was set to 6 microns. Thus obtained MR head is referred to as Example 4.

In Example 5, a MR head was produced in the same way as in Example 4 except omission of the step of patterning the ground layer 13. In Example 6, an MR head was produced in the same way as in Example 4 except for that no ground layer was provided. With the above MR heads, electric resistance versus magnetic field (R-H) curves were measured by applying an external magnetic field by causing a sense current of 10 Ma. The R-H curves serve as an index of the sensitivity of the MR heads, and their half amplitude values and also whether there is Barkhausen noise are shown in Table 2. As is obvious from the results shown in Table 2, the MR head according to the invention is highly sensitive, free from recognizable Barkhausen noise and has excellent performance.

Since in this embodiment NiFe is used for the ferromagnetic magnetoresistive effect layer and ground layer, it is possible to reduce targets. Similar characteristics are of course obtainable by using a different alloy having a face-centered cubic structure for the ground layer.

With this embodiment of the magnetoresistive head according to the invention, a portion of the anti-ferromagnetic layer with the ground layer provided thereunder may be made to serve as a layer for generating a longitudinal bias magnetic field, and a portion without any ground layer thereunder is made to serve as a layer for magnetically isolating the ferromagnetic magnetoresistive effect layer and the soft magnetic bias layer. It is thus possible to obtain a magnetoresistive head, which is simple, excellent in the reproducibility and free from Barkhausen noise. Besides, the ferromagnetic magnetoresistive effect layer and ground layer may be made of the same material. Further, it is possible to reduce targets.

What is claimed is:

1. In a magnetoresistive head comprising a substrate, a ferromagnetic magnetoresistive effect layer dispose on said substrate, an anti-ferromagnetic layer for generating a longitudinal bias magnetic field by an exchange force with respect to said ferromagnetic magnetoresistive effect layer, said anti-ferromagnetic layer being provided in direct contact with said ferromagnetic magnetoresistive effect layer and composed of or mainly composed of FeMn, and means for generating a transversal bias magnetic field in said ferromagnetic magnetoresistive effect layer, wherein a ground layer having a face-centered cubic structure is provided on a portion of said anti-ferromagnetic layer.

2. The magnetoresistive head according to claim 1, said ground layer is Cu or alloys of NiCr having face-centered cubic structures.

3. The magnetoresistive head according to claim 1, wherein said ferromagnetic effect layer is made of material selected from the group consisting of Co, Ni, Ni—Fe, Co—Fe, and Co—Ni.

4. The magnetoresistive head according to claim 1, wherein said anti-ferromagnetic layer is made of FeMn.

5. A magnetoresistive head comprising a substrate, a ferromagnetic magnetoresistive effect layer disposed on said substrate, an anti-ferromagnetic layer for generating a longitudinal bias magnetic field by an exchange coupling force with respect to said ferromagnetic magnetoresistive effect layer, and a soft magnetic bias layer for generating a transversal bias magnetic field in said ferromagnetic magnetoresistive effect layer, wherein said soft magnetic bias layer has a crystal structure, a ground layer having a face-centered cubic structure is provided on a portion of said anti-ferromagnetic layer between said anti-ferromagnetic layer and said substrate, and said soft bias layer, said ground layer, said anti-ferromagnetic layer and said ferromagnetic magnetoresistive effect layer are laminated in the mentioned order.

6. The magnetoresistive head according to claim 5, wherein said ferromagnetic magnetoresistive effect layer is of the same material as said ground layer.

7. The magnetoresistive head according to claim 5, wherein said anti-ferromagnetic layer is made of FeMn or a material mainly composed of FeMn.

8. The magnetoresistive head according to claim 5, wherein said ground layer is made of material selected from the group consisting of Cu and alloys of NiCr having face-centered cubic structures.

9. The magnetrocsistive head according to claim 5, wherein said anti-ferromagnetic layer is an anti-ferromagnetic alloy made of material selected from the group consisting of FeMn and FeMnCr.

10. The magnetoresistive head according to claim 5, wherein said ferromagnetic magnetoresistive effect layer is made of material selected from the group consisting of Co, Ni, Ni—Fe, Co—Fe, and Co—Ni.

11. The magnetoresistive head according to claim 5, wherein said soft magnetic bias layer is a non-crystalline soft magnetic material comprising CoZr.

12. The magnetoresistive head according to claim 5, wherein said soft magnetic bias layer is a non-crystalline soft magnetic material comprising CoZrNb.

13. The magnetoresistive head according to claim 5, wherein said soft magnetic bias layer is a non-crystalline soft magnetic material comprising CoZrMo.

14. The magnetoresistive head according to claim 5, wherein said soft magnetic bias layer is a non-crystalline soft magnetic material comprising CoZrTa.

15. The magnetoresistive head according to claim 5, wherein said soft magnetic bias layer is a non-crystalline soft magnetic material comprising CoTa.

16. In a magnetoresistive element comprising a substrate, a ferromagnetic magnetoresistive effect layer disposed on said substrate, an anti-ferromagnetic layer for generating a longitudinal bias magnetic field by an exchange force with respect to said ferromagnetic magnetoresistive effect layer, said anti-ferromagnetic layer being provided in direct contact with said ferromagnetic magnetoresistive effect layer, and composed of or mainly composed of FeMn, and means for generating a transversal bias magnetic field in said ferromagnetic magnetoresistive effect layer, wherein a ground layer having a face-centered cubic structure is provided on a portion of said anti-ferromagnetic layer between said anti-ferromagnetic layer and said substrate.

17. In a magnetoresistive effect element comprising a substrate, a ferromagnetic magnetoresistive effect layer disposed on said substrate, an anti-ferromagnetic layer for generating a longitudinal bias magnetic field by an exchange coupling force with respect to said ferromagnetic magnetoresistive effect layer, and a soft magnetic bias layer for generating a transversal bias magnetic field in said ferromagnetic magnetoresistive effect layer, wherein said soft magnetic bias layer has a crystal structure, a ground layer having a face-centered cubic structure is provided on a portion of said anti-ferromagnetic layer between said anti-ferromagnetic layer and said substrate, and said soft bias layer, said ground layer, said anti-ferromagnetic layer and said ferromagnetic magnetoresistive effect layer are laminated in the mentioned order.

* * * * *

UNITED STATES PATENT AND TRADEMARK OFFICE
CERTIFICATE OF CORRECTION

PATENT NO.   :   5,556,718
DATED        :   September 17, 1996
INVENTOR(S)  :   Yoshihiro MOTOMURA It is certified that error(s) appears in the above-identified patent and that said Letters Patent is hereby corrected as shown below:

Column 4, between lines 17 and 18, insert the following Table 1:

| Sample    | R-H Curves (Half Width) | Barkhausen Noise |
|-----------|-------------------------|------------------|
| Example 1 | 100                     | Free from noise  |
| Example 2 | 150                     | Free from noise  |
| Example 3 | 100                     | Free from noise  |

TABLE 1

UNITED STATES PATENT AND TRADEMARK OFFICE
CERTIFICATE OF CORRECTION

PATENT NO.    :    5,556,718
DATED         :    September 17, 1996
INVENTOR(S)   :    Yoshihiro MOTOMURA It is certified that error(s) appears in the above-identified patent and that said Letters Patent is hereby corrected as shown below:

Column 5, between lines 44 and 45, insert the following Table 2:

| Sample    | R-H Curves (Half Width) | Barkhausen Noise |
|-----------|-------------------------|------------------|
| Example 4 | 100                     | Free from noise  |
| Example 5 | 150                     | Free from noise  |
| Example 6 | 100                     | Existence        |

TABLE 2

Signed and Sealed this

Twenty-first Day of January, 1997

BRUCE LEHMAN

Attest:

Attesting Officer

Commissioner of Patents and Trademarks